United States Patent
Ramaswamy et al.

(10) Patent No.: US 7,457,851 B2
(45) Date of Patent: Nov. 25, 2008

(54) APPARATUS AND METHODS FOR INFORMATION TRANSFER USING A CACHED SERVER

(75) Inventors: Kumar Ramaswamy, Princeton, NJ (US); Jun Li, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 286 days.

(21) Appl. No.: 10/498,403

(22) PCT Filed: Dec. 10, 2002

(86) PCT No.: PCT/US02/39474
§ 371 (c)(1), (2), (4) Date: Jun. 10, 2004

(87) PCT Pub. No.: WO03/052609
PCT Pub. Date: Jun. 26, 2003

(65) Prior Publication Data
US 2005/0010648 A1    Jan. 13, 2005

Related U.S. Application Data

(60) Provisional application No. 60/340,551, filed on Dec. 13, 2001.

(51) Int. Cl.
*G06F 15/16* (2006.01)

(52) U.S. Cl. .................. 709/219; 709/203; 709/218; 709/229; 709/232

(58) Field of Classification Search ........... 709/203, 709/219, 225, 229, 232
See application file for complete search history.

(56) References Cited

U.S. PATENT DOCUMENTS

| | | | | |
|---|---|---|---|---|
| 5,933,603 A | * | 8/1999 | Vahalia et al. | 709/225 |
| 5,940,594 A | * | 8/1999 | Ali et al. | 709/203 |
| 5,991,306 A | * | 11/1999 | Burns et al. | 370/429 |
| 6,742,040 B1 | * | 5/2004 | Toga | 709/229 |
| 2001/0003828 A1 | * | 6/2001 | Peterson et al. | 709/219 |
| 2001/0037360 A1 | | 11/2001 | Ekkel | |
| 2005/0273514 A1 | * | 12/2005 | Milkey et al. | 709/232 |

FOREIGN PATENT DOCUMENTS

| | | |
|---|---|---|
| CN | 1243389 | 2/2000 |
| JP | 2000-057070 | 2/2000 |
| JP | 2001-186499 | 7/2001 |
| JP | 2001-211197 | 8/2001 |
| JP | 2001-290954 | 10/2001 |

OTHER PUBLICATIONS

Search Report Dated Feb. 10, 2003.

* cited by examiner

*Primary Examiner*—Quang N. Nguyen
(74) *Attorney, Agent, or Firm*—Joseph J. Laks; Robert D. Shedd; Jerome G. Schaefer

(57) ABSTRACT

Apparatus and methods for information transfer using a cache server are disclosed. A user requests a file via a file requesting device, over a network, from a host. The host transfers the file to a cache server over a connection at a first scheduled time. The cache server then transfers the file, over a second network, to a file receiving device at a second scheduled time.

18 Claims, 1 Drawing Sheet

APPARATUS AND METHODS FOR INFORMATION TRANSFER USING A CACHED SERVER

This application claims the benefit, under 35 U.S.C. § 365 of International Application PCT/US02/39474, filed Dec. 10, 2002, which was Published in accordance with PCT Article 21(2) on Jun. 26, 2003 in English and which claims the benefit of U.S. Provisional patent application No. 60/340,551, filed Dec. 13, 2001.

FIELD OF THE INVENTION

The present invention relates to information transfer in communication networks. More specifically, the present invention relates to information transfer in communication networks.

BACKGROUND OF THE INVENTION

Communication networks have a range of bandwidths. A low bandwidth network generally provides slower transfer of the same amount of digital information as compared to a high bandwidth network. The comparatively slow transfer rate of low bandwidth networks may create difficulties when transferring large amounts of digital information. Multimedia digital information, e.g. audio, video, etc., generally requires high bandwidth networks for its transmission, as multimedia digital information files are generally large. Transferring those large multimedia files over low bandwidth networks may be impractical because of time, efficiency and/or cost constraints.

Low bandwidth networks, however, are often more convenient than high bandwidth networks. Thus, the user may use a low bandwidth network because of convenience, but be unable or unwilling to access multimedia files over that same low bandwidth network, thus leading to difficulties for the multimedia digital information provider. On the one hand, the potential audience for the multimedia provider's content may be greater in the low bandwidth network space, yet on the other hand, the provider may simply be unable to reach that audience with the content because of the difficulties in transmitting multimedia content over a low bandwidth network.

Accordingly, there exists a need for apparatus and methods that provide both the benefits of low bandwidth access and the capacity of high bandwidth access to multimedia digital information services.

SUMMARY OF THE INVENTION

The present invention comprises apparatus and methods for information transfer using a cache server. A user transmits a request for a file via a host, over a first access network, from a file requesting device. The host then transfers the file to a cache server at a first scheduled time. The file is then transferred by the cache server to a user's file receiving device, at a second scheduled time, over a second access network.

Additional advantages and novel features of the invention will be set forth in part in the description and figures which follow, and in part will become apparent to those skilled in the art on examination of the following, or may be learned by practice of the invention.

DETAILED DESCRIPTION OF THE PREFERRED EMBODIMENTS

Figure 1:
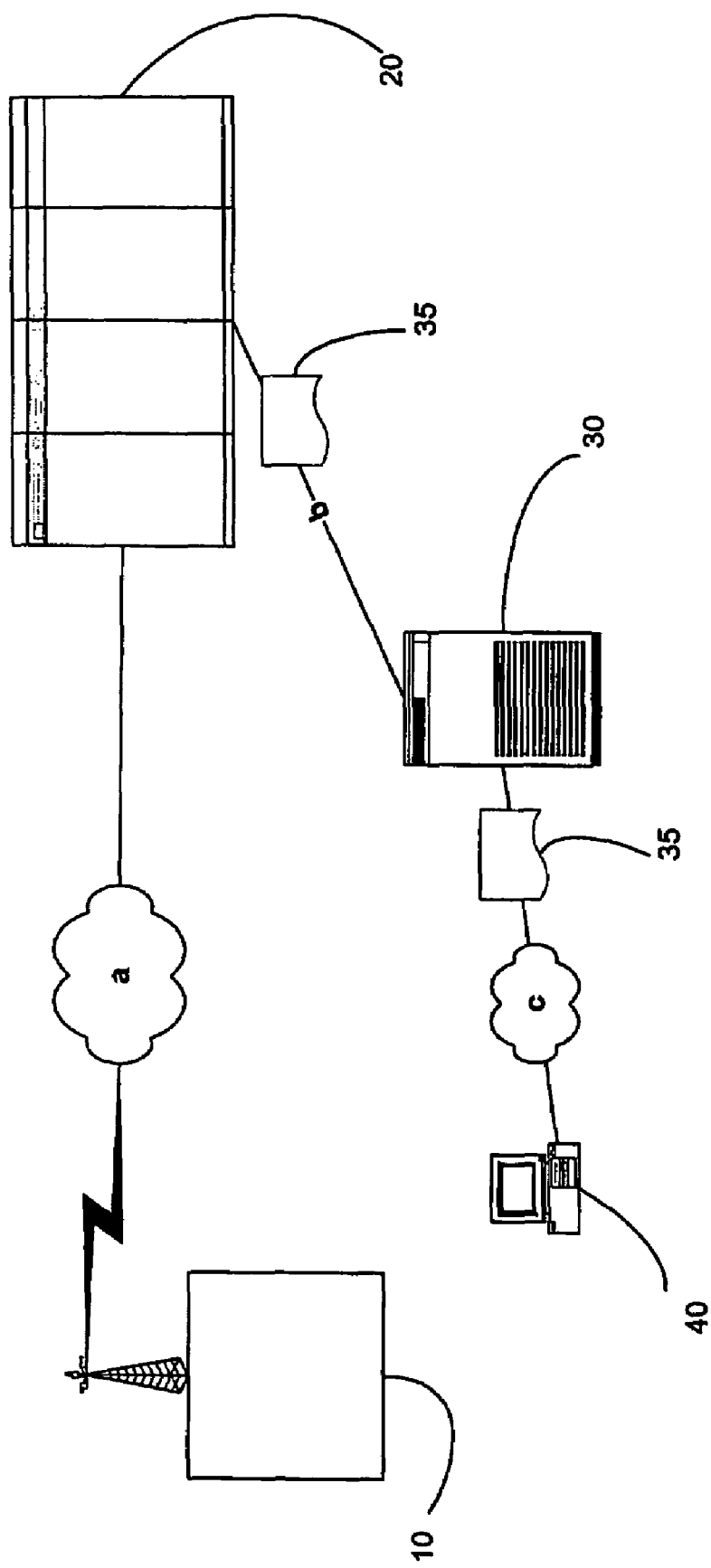
FIG. 1 is a schematic diagram of a preferred embodiment.

FIG. 1 shows a preferred embodiment of the present invention. File requesting device 10 has a low bandwidth access network a, such as a CDMA wireless access network, to host 20. The file requesting device 10, in this embodiment, has a personal digital assistant (PDA) form factor having wireless network capabilities and an operating system (OS) (which may be an OS as is known in the art, e.g. Palm OS, Windows CE, Pocket PC, Linux, etc.).

With file requesting device 10, the user may request content, code, data, information and/or files (referred to generally herein as a "file") on the host 20. The host, in this embodiment is a content server which may be implemented in Unix® and Unix®-like platforms, including but not limited to Linux® and its variants, as well as other operating system platforms including but not limited to Microsoft Windows® XP, NT, Windows® 2000, Windows® 95, 98 and Me, IBM OS/390, MacOS, VxWorks® and others.

In the various preferred embodiments, the user requests a file through a mobile low bandwidth network, and then downloads the file through a high bandwidth network. Thus, the host can establish a schedule to efficiently distribute files to a cache server, according to, for example, network usage parameters. In other preferred embodiments, files may be registered to a file or content server (which may or may not be the same system as the host, which accepts requests from a user) and then transferred to a cache server based upon requests to the host.

Returning now to the embodiment of FIG. 1, host 20 connects to cache server 30, across connection b, which in the embodiment of FIG. 1 is a private network, and transmits the file 35 directly to the cache server 30. Other embodiments may utilize other connections between host and cache server, e.g. network connections such as a LAN, WAN, the Internet, etc. It should be noted that embodiments may be implemented through distributed services as well. For example, a host may be a web server only, with a listing of files, accessible to the user, that is actually stored on one or more other servers. Those one or more servers in turn, would be responsible for transferring the file, through a content redirection component, to a cache network, etc. Thus, one or more systems and/or servers may be used in various embodiments.

The time of host-to-cache server transfer may depend upon a number of conditions in various embodiments. So, for example, in the embodiment of FIG. 1, host and cache server status, status of connection b, etc. may be taken into account when scheduling a host-to-cache server transfer. In the preferred embodiments, the transfer is according to a desired schedule, which may be static in various embodiments, e.g. upon the user's request, etc., or dynamic, such as when host status, cache server status, network status, user status, cost of transfer over a network, etc. are considered as well. For example, if the host-to-cache server connection is through a local network, and the network has a relatively small load, then the transfer may occur as soon as the user has requested the file. If the network is loaded near capacity, then file transfer may be delayed until more favorable conditions are present. The host may also delay transfer for a lower priority user. The type of file may also determine, in whole or part, file transfer from the cache. An especially newsworthy file may, for example, be transferred more quickly than an entertainment file.

The size of the cache within a cache server may determine performance, of course, and so cache size is chosen through consideration of various parameters. For example, multimedia files require a relatively large server. For audio files only, a relatively smaller cache may be used. Of course, in various preferred embodiments, more than one cache and/or cache server may be desired, and files are stored on the various caches or cache servers according to various parameters, such as time of delivery, type of file, etc. Additionally, a cache server may set its caches dynamically, expanding and contracting as files are received and transmitted. Files may reside therein for a set duration, whether or not transferred.

The cache server may be any of a number of type of systems. For example, the cache server may be implemented in Unix® and Unix®-like platforms, including but not limited to Linux® and its variants, as well as other operating system platforms including but not limited to Microsoft Windows® XP, NT, Windows® 2000, Windows® 95, 98 and Me, IBM OS/390, MacOS, VxWorks® and others.

Returning now to the embodiment of FIG. 1, cache server 30 subsequently downloads the file 35 to file receiving device 40, that is, the file consumer, who may or may not be the same user as the file requestor, through high speed network c. In the especially preferred embodiments, this is a high capacity "hotspot" type network connection. A hotspot connection permits subsequent downloading of the requested content, to the file consumer once he or she has a presence in the hotspot network, in a manner that will be described in further detail below. Usually download will be on an optimized basis, i.e., taking into account various conditions for optimum delivery time, including file receiving device status and cache server status, status of the network, etc. Transfer of the file from the cache server to the user is according to a desired schedule, which may be static in various embodiments, such as when only the user provided expected delivery time is considered, or dynamic, such as when host status, cache server status, network status, user status, cost of transfer over a network, etc. are considered as well. For example, if the file receiving device is at a hotspot on a wireless network, the download time may be constrained to the user's duration at the hotspot.

Various types of transmission as known in the art may be used to transfer the file from cache server to user. For example, unicasting, broadcasting or multicasting may be used from cache server to user, with the selection of the latter two depending upon requests by more than one user for content. Multiple delivery schemes, such as broadcasting and/or multicasting, will usually result in improved speed for content delivery.

Any preferred type of devices may receive the requested file, (e.g. PDA, cell phone, notebook computer, desktop computer, personal video recorder, etc., herein referred to as a "file receiving device") so long as the file receiving device has a high speed network capability. It should also be noted that, in certain embodiments, the user may use a device as both a file requesting device and a file receiving device. The user who receives the file (who does not have to be the same individual as the user requesting the file, of course) is, in the preferred embodiments identified through techniques as known in the art, such as authentication techniques and the like.

In some embodiments, the user's location on the high capacity network may be predicted, and thus content available for download according to the prediction.

Users may be assigned access and/or download rights depending upon their status with the file provider. Those with a preferred status may have different download rights, a different possible schedule of download rights, etc. than other users. Users may also be provided with a content redirection device, in the manners disclosed in co-pending U.S. application Ser. No. 60/340,551, entitled APPARATUS, METHODS AND ARTICLES OF MANUFACTURE FOR WIRELESS COMMUNICATION NETWORKS, filed 13 Dec. 2003, and thus be responsible for direction of the file to the cache server.

In one embodiment, the user requests a file via a file requesting device from the server. The server schedules the delivery to the cache server, and, at the appropriate time, sends the file to the cache server. The cache server then schedules delivery to the file receiving device, and, at the appropriate time, sends the file, where it is received by the file receiving device.

Thus, in the various preferred embodiments of the present invention, downloading performance is optimized by separating the file requesting process, from the file receiving process. In so separating the two processes, potential bottlenecks such as the low bandwidth network status and client accessibility are minimized.

The above description and the views and material depicted by the figures are for purposes of illustration only and are not intended to be, and should not be construed as, limitations on the invention. Moreover, certain modifications or alternatives may suggest themselves to those skilled in the art upon reading of this specification, all of which are intended to be within the spirit and scope of the present invention as defined in the attached claims.

The invention claimed is:

1. A method for transferring information comprising the steps of:
   receiving a request for a file via a host, over a first access network, from a file requesting device;
   transferring said file from said host to a cache server at a first scheduled file transfer commencement time;
   transferring said file from said cache server to a file receiving device at a second scheduled file transfer commencement time over a second access network,
   wherein the first scheduled file transfer commencement time and the second scheduled file transfer commencement time are at least based on a type of the file, and
   wherein the second scheduled file transfer commencement time is at least further based on a duration of the file receiving device at a hotspot.

2. The method for transferring information as in claim 1, where said first access network and said second access network are the same access network.

3. The method for transferring information as in claim 1, where said file requesting device and said file receiving device are the same device.

4. The method for transferring information as in claim 1, wherein said first access network is a wireless access network.

5. The method for transferring information as in claim 1, wherein said second access network is a high bandwidth network.

6. The method for transferring information as in claim 5, wherein said second access network is a high capacity hotspot network.

7. The method for transferring information as in claim 1, wherein said file requesting device is selected from the group consisting of personal digital assistant, cell phone, notebook computer and personal computer.

8. The method for transferring information as in claim. 1, wherein said file receiving device is selected from the group consisting of personal digital assistant, cell phone, notebook computer and personal computer.

9. The method for transferring information as in claim 1, wherein transferring said file from said host to the cache server at a first scheduled file transfer commencement time further comprises transferring said file from said host to the cache server at the first scheduled file transfer commencement time over a third network.

10. A system for transferring information comprising:
a file requesting device;
a host;
a cache server;
a file receiving device;
wherein when a request for a file is made by said file requesting device over a first access network to said host, said host transfers said file to said cache server over a connection upon a first scheduled file transfer commencement time, and said cache server transfers said file to said file receiving over a second access network upon a second scheduled file transfer commencement time,
wherein the first scheduled file transfer commencement time and the second scheduled file transfer commencement time are at least based on a type of the file, and
wherein the second scheduled file transfer commencement time is at least further based on a duration of the file receiving device at a hotspot.

11. The system for transferring information as in claim 10, where said first access network and said second access network are the same network.

12. The system for transferring information as in claim 10, where said file requesting device and said file receiving device are the same device.

13. The system for transferring information as in claim 10, wherein said first access network is a wireless network.

14. The system for transferring information as in claim 10, wherein said second access network is a high bandwidth network.

15. The system for transferring information as in claim 13, wherein said second access network is a high capacity hotspot network.

16. The system for transferring information as in claim 10, wherein said file requesting device is selected from the group consisting of personal digital assistant, cell phone, notebook computer and personal computer.

17. The system for transferring information as in claim 10, wherein said file receiving device is selected from the group consisting of personal digital assistant, cell phone, notebook computer and personal computer.

18. The system for transferring information as in claim 10, wherein said connection comprises a third network.

* * * * *